United States Patent [19]
Biemans et al.

[11] Patent Number: 5,197,011
[45] Date of Patent: Mar. 23, 1993

[54] WORK STATION CONTROLLER MODULE

[75] Inventors: Franciscus P. M. Biemans, Biel, Switzerland; Sjoerd Sjoerdsma, Eindhoven, Netherlands

[73] Assignee: U.S. Philips Corporation, New York, N.Y.

[21] Appl. No.: 524,252

[22] Filed: May 15, 1990

[30] Foreign Application Priority Data

May 17, 1989 [EP] European Pat. Off. ......... 89201248.5

[51] Int. Cl.$^5$ ........................ G06F 15/46; G06F 15/16
[52] U.S. Cl. .............................. 364/468; 340/825.06; 364/132
[58] Field of Search ................ 364/468, 478, 131-135, 364/474.11, 138, 139; 340/825.07, 825.06, 825.22, 825.23

[56] References Cited

U.S. PATENT DOCUMENTS

| | | |
|---|---|---|
| 4,472,783 | 9/1984 | Johnstone et al. ............. 364/468 X |
| 4,698,766 | 10/1987 | Entwistle et al. ................ 364/468 |
| 4,827,423 | 5/1989 | Beasley et al. ................. 364/131 X |
| 4,901,218 | 2/1990 | Cornwell ....................... 364/468 X |
| 5,014,208 | 5/1991 | Wolfson ........................ 364/468 |

OTHER PUBLICATIONS

Frank P. Biemans, "A Reference Model for Manufacturing Planning and Control Systems", Document No.: MS-89-030, Apr. 11, 1989 (Entire Document).

*Primary Examiner*—Joseph Ruggiero
*Attorney, Agent, or Firm*—Anne E. Barschall

[57] ABSTRACT

A work station controller module for use in an industrial manufacturing system is described. The manufacturing system is hierarchically organized. A superior level is covered by a host machine, a lower level by automation modules that fulfill the manufacturing and transport primitives. The controller module receives higher level commands for decomposition into lower level commands. It also receives lower level status signals for aggregation into higher level status signals. It also exchanges product exchange requests and product exchange acknowledgements with a product transfer system. It further receives operation names and process data from a product development system and status aggregation rules and command decomposition rules from a product preparation system. These rules govern the decomposition/aggregation cited earlier.

8 Claims, 2 Drawing Sheets

WORK STATION CONTROLLER MODULE

BACKGROUND TO THE INVENTION

The invention relates to a controller module for use in a work station, in particular, an industrial work station which is an element of a manufacturing control system. Manufacturing, in its broadest sense, encompasses various primitive, and undivided, operations on a product, such as test, storage or transformation. A work station thus comprises a controller module and one or more execution modules. An execution module may influence or observe the product in its environment; the product may thus be changed in this environment. A work station controller module as recited supra has been described by Scott and Strauss, "Work station control in a computer integrated manufacturing system", National Bureau of Standards, Washington, D.C., May 1984. Like the reference, the controller module of the present invention is adapted for use in transforming discrete products of all type. Transformation may be realized in manufacturing operations of all kinds, such as changing the product shape, assembling, modifying physical properties, sorting, testing, moving, packaging, combining and many others.

SUMMARY TO THE INVENTION

The inventors have realized that in such product transformation environments it is often possible to identify general tasks which are applicable to many different types of product transformation, so that the organization of the control could be independent of either product type or transformation type. Examples of such general tasks are:
- management of product availability (before, during and after transformation) which is tantamount to stock control;
- coordination among various transformation facilities, such as successive or parallel batch processing elements, merging and splitting of product streams;
- updating of various material properties (mechanical, dimensional, chemical, physical, electrical, etcetera);
- execution of the product transformation proper. In particular in this latter case, the controller module is rendered general-purpose by the extensive application of parameter/operation parametrization. Such parametrization may also be usefull to the three earlier aspects, but the embodiment hereinafter specifically relates to the product transformation parametrization.

In consequence, among other things it is an object of the invention to provide a work station controller that is applicable in general purpose situations, allows for a hierarchical transformation organization, may be used as a module in a multi-module system, is easy to reconfigure and to install, for a variety of products/transformations/ production scale. A first aspect of the object is realized in the invention by a work station controller module for controlling a work station and comprising processor means interconnected to storage means. The processor means produces lower level commands and higher level status signals on the basis of predetermined operation-linked process data and under control of higher level commands and lower level status signals. The work station controller module further comprises:
first bidirectional communication means for receiving said higher level commands from and transmitting said higher level status signals to a host device;
second bidirectional communication means for receiving said lower level status signals from and transmitting said lower level commands to one or more product processing automation modules;
third bidirectional communication means for transmitting product exchange requests and receiving product exchange acknowledgements with respect to any access point the work station has in common with a product transfer system or with at least one other work station;
first receiving means for receiving operation names and process data from a product development system;
second receiving means for receiving status aggregation rules for aggregating said lower level status signals to said higher level status signals and command decomposition rules for decomposing said higher level commands to said lower level commands from a product preparation system.

Various further aspects of the invention are recited in dependent claims.

Among other elements, the following are notable advantages of applying the invention:
there exists a separation between the generation of the commands on the one side and the strategy of their execution, on the other; for one, this allows the host device to abstract from, or even ignore execution problems on a lower level;
a work station controller module may interpret the strategy of execution that is presented in a recipe; for each product there is a recipe, its execution depending on both the commands from the host and the actual status of the work station; this methodology enhances flexibility;
the execution proper of a command may be rendered dependent on both the applicable recipe, and the actual control by the higher level, such as represented by suspend and cancel commands, and their respective inverses;
the work station controller module is standardizable through its general purpose applicability; it is suitable for integration because it has only few interfaces, it has excellent control features through operation, suspend, continue, cancel commands in addition to provision of status information and command accept acknowledgement, it has good reproducibility through commands for serially repetitive execution, and high performance through parallel execution of commands, safety through alarm handling capability, simplicity through exclusion of superfluous functionality, easy application-dependent applicability through input of recipes, of addresses of the transport system, of automation module entry points, and of an initial world model;
the work station controller module can control multiple operational domains, provided only, that the processing facilities and/or storage capability were sufficient therefor. Such multiple domains could relate to serially disposed automation modules in a single production stream (possibly separated by a transport facility or a temporary buffer), to correspondingly disposed automation modules in parallel production streams, or even to completely unrelated manufacturing/testing/etcetera operations. The internal organization could then occur on the basis of time-multiplex, job-multiplex, interrupt-driven or requests according to respective priority levels with associated arbitrage.

BRIEF DESCRIPTION OF THE FIGURES

The invention will be explained in detail with respect to the accompanying Figures, wherein.

DESCRIPTION OF THE PREFERRED EMBODIMENTS

1. Conceptual Environment

Figure 1:
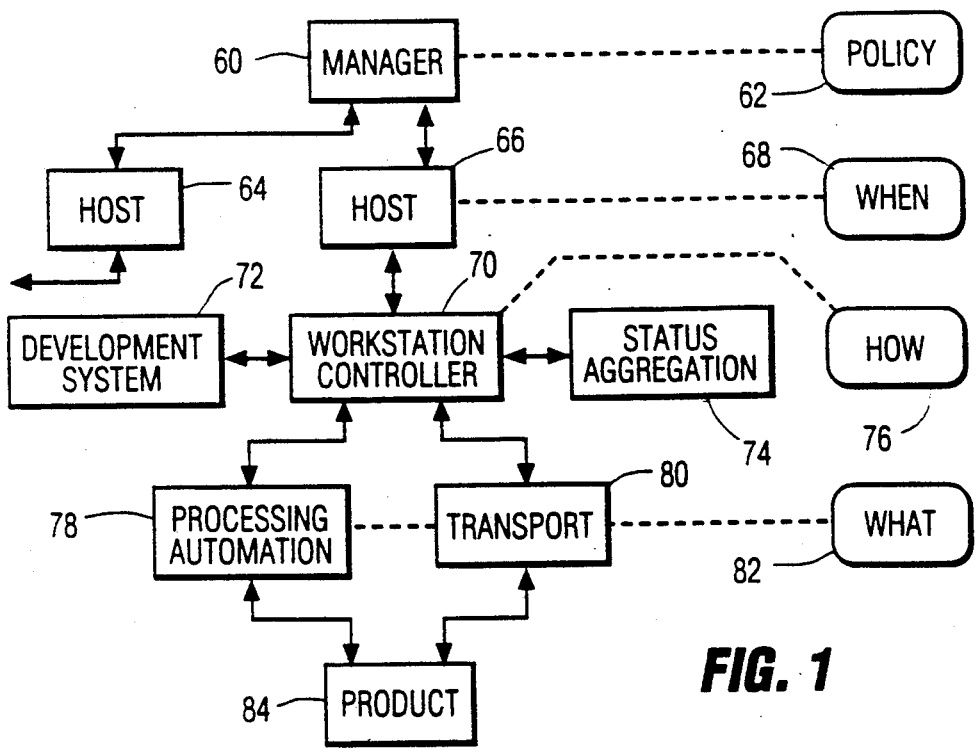
FIG. 1 shows a conceptual environment of the work station controller module.

FIG. 1 shows a conceptual environment of the work station controller module. Rectangular blocks represent functional entities. Blocks with rounded corners indicate the category of questions that the associated hardware and software level solves. Now, block 60 is the overall control system, herein the policy (62) is determined, such as product mix, quality levels, intermediate storage levels. One or more host subsystems 64, 66 interact with the overall control system and possibly, with each other. In general, the host level decides (68) where and when the various activities, such as product transformations are to be executed. Block 70 symbolizes the work station controller module. On a hardware level, this controller module is realized as a general purpose computer with appropriate processor means interconnected to storage means and suitable programming for executing its technical industrial task. A standard solution would be the Digital Equipment Corporations VAX machine series. Of late, IBM's computer PS/2 would be suitable. The interconnections between various subsystems in FIG. 1 may be executed as point-to-point lines, as a single network such as VME, Ethernet, or with other means according to requirements. For brevity, no further explanation of the hardware is given. The work station controller 70 interacts with its own host 66, if required with other work station controller modules 71 and, among other things, comprises aggregation module 74. In general, the work station controller module solves (76) the question how various changes should be effected, that is, to what quantitative and/or qualitative degree. On the lowest level, automation modules, to wit processing module 78 and transport module 80 directly interact with an identified product 84 or amount of product, and with their work station controller 70. The process identification is symbolized by block 82. As explained elsewhere, processing includes modifying the product, testing the product, repairing the product, detecting the product's position or orientation and other such primitive operations.

2. Work Station

Figure 2:
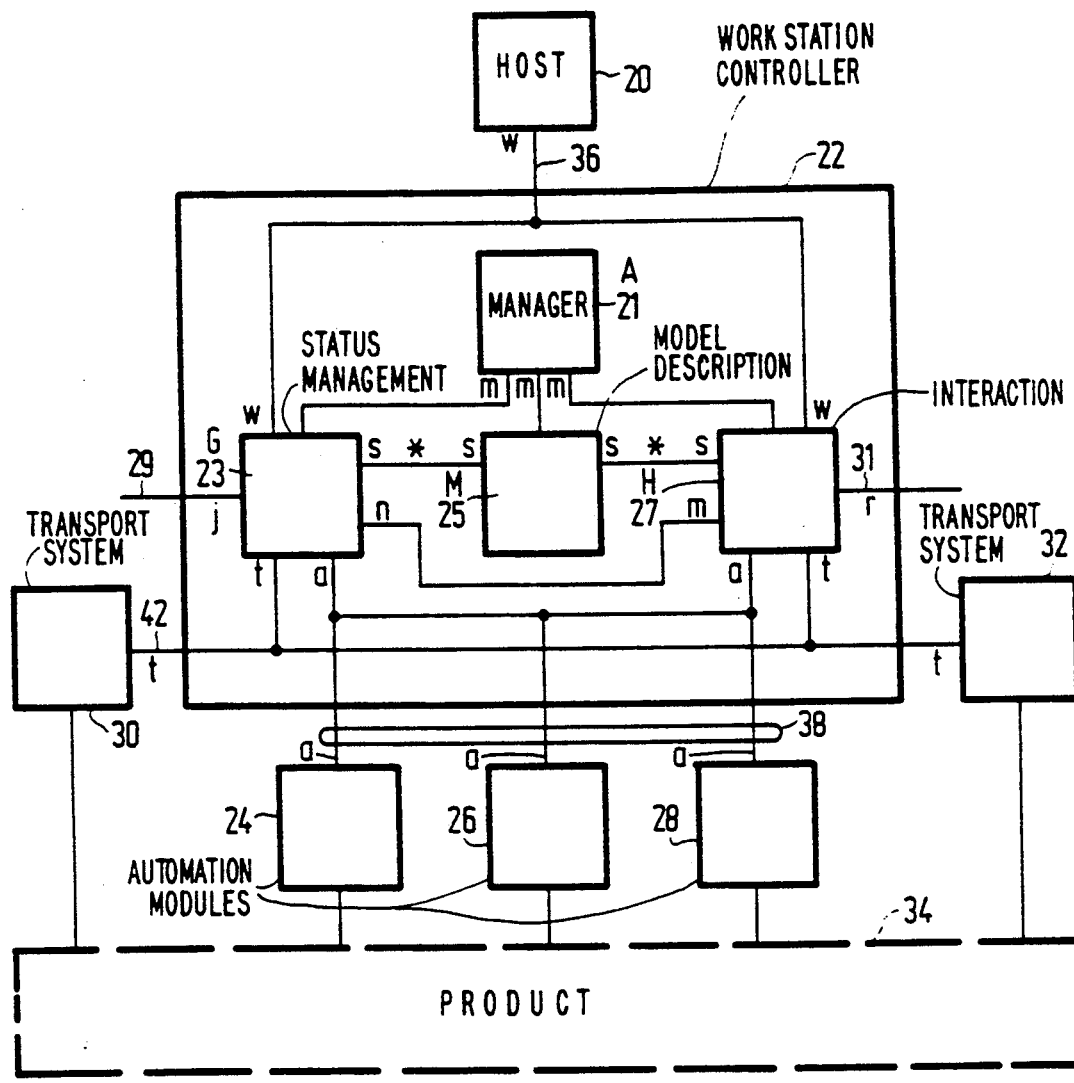
FIG. 2 is a detailed block diagram of the work station and its close environment.

FIG. 2 is a detailed block diagram of the work station and its close environment. The architecure is described in terms of 'processes': black boxes that accept and generate information.

If the workstation controller performs two activities in parallel, the architecture is described as a multiprocessing organization (single or plural procesors) each process executing one activity.

The workstation controller 22 is designed as a set of four parallel processes, the so-called H Module 27, G Module 23, M Module 25, and A module 21. The functions of these modules are: 1. The H Module 27 accepts commands from a host 20, reports back to the host whether or not the commands are accepted or rejected, issues sub-commands to automation modules 24, 26, 28 and messages to the transport system 30, 32 or to other work station controllers to negotiate the exchange of products. To that end, the H Module, inter alia:

accepts commands.

when required, executes recipes which prescribe which actions have to be carried out by the automation modules in order to fulfil commands.

manages recipes. 2. The M Module 25 maintains a model description of the subordinate automation modules 24, 26, 28 and that part of the environment that is within the domain of the work station. That model ('world model') contain such information as the configuration of automation modules, their capabilities and capacities, the products and tools inside the domain of the work station. Such information is used, for example, by the H Module to decide to which automation module a command can best be issued. 3. The G Module 23 collects and processes/aggregates status signals from the automation modules 24, 26, 28 in order to keep the world model of the M Module as consistent as possible with the real world. The G Module of a work station controller ensures, for example, that the world model contains up-to-date information on the products that are present in the workstation's domain (which products and where). The G Module also provides the host 20 with status signals. The status offered to the host is so called 'aggregate status': status about the workstation in total as opposed to status of individual automation modules. Suppose that one automation module has a defect so that the workstation can no longer execute a certain operation. The manager system 60 should only be informed that the workstation can no longer execute that operation; it does not have to know which automation module is the cause. The G Module also has to establish whether or not some status gives rise to an alarm. In case of alarm, the G module suspends the H module in that commans are accepted from the host, but lower level commands are no longer given to the automation modules, as long as the alarm prevails.

In addition to these three modules, there is a manager A, 21. The manager offers to H, M and G Modules 23, 25, 27 parameter values that are characteristic for a particular application and that may vary in time.

In FIG. 2, the various 'streams' of communications are indicated by 'gates', letters. Processes that have one or more gates in common can communicate, as follows:

\* = update, status request m : values from manager to H Module, or values from manager to G Module, or values from manager to M Module.

a : messages from/to automation modules (38).

t : messages from/to transport system (42).

w : messages from/to host (36).

r : recipes from development system (31).

f : formulae from development system (29).

s : status to and from M Module

Finally, the FIG. 2 shows the product 34 as being operated by the automation modules 24, 26, 28

(inclusive of test module 28) and transport system 30, 32.

2.1 THE H MODULE

The H module 27 is initialized in that it receives the following application-dependent data from host 20:

Its potential activity. This is a set of Operation Descriptors, that are activated when the controller module itself is activated. Some are self-terminating, others would remain active permanently.

The autonomous operations. This is a further set of Operation descriptors, that are activated when the controller module itself is activated. Some are self-terminating, others would remain permanently active.

The Partners. This is a set of addresses of its automation modules 24, 26, 28 and the address of the work station controller. After receiving this information the H module is controlled to start up the whole work station controller 22.

The H module behaves as three concurrent processes:

a. - ACCEPT COMmandS process: Operation Commands, Suspend Commands, Continue Commands and Cancel Commands destined for the workstation are received from host 20. The Operation Commands are either accepted or rejected. The accepted ones are kept for execution. The Suspend, Continue and Cancel Commands are executed. An Operation Command is passed to EXECute COMmandS process for execution.

b. - EXECute COMmandS process: The Operation Commands are executed. EXECute COMmandS will process and consider recipe lines for evaluation and execution.

c. - RECIPE MANAGER process: The recipes are maintained, updated or deleted.

The latter three activities are discussed in more detail below.

2.1.1. ACCEPT COMMANDS

ACCEPT COMmandS maintains the following data for the purposes of administration:

A set of Operation Commands. The set of Operation Commands contains the Operation Commands that are executed by the work station. The Repeat Number of the Operation Command indicates the number of Operations that can still be suspended or cancelled. Suppose, for example, that an Operation Command is executed 10 times. If the work station controller has started the execution of the first Operation out of the series of ten, nine Operations can still be cancelled or suspended. The Operation Command should then contain the repeat number '9'.

A first set of Entry Codes of the operations that are suspended.

A further set of Entry Codes Entry of the operations that are cancelled.

ACCEPT COMmandS performs one of the following six functions, it: 1. either, receives an Operation Command destined for the work station. It then inspects the Potential Activity to decide whether or not the operation can be executed If it cannot be executed, the process ACCEPT COMmandS will return a Rejection Indication to host 20. The Rejection Indication contains the Entry Code of the rejected Operation Command. If the operation is accepted, the process, ACCEPT COMmandS, concurrently:

responds to the host with an Acceptance Indication which contains the Entry Code of the accepted Operation Command.

issues the Operation Description and Entry Code contained in the Operation Command to the process° EXECute COMmandS, for execution of the operation. Next, a new Operation Command is inserted in the set of Operation Commands.

2. or, receives a Suspend Command destined for the work station. It then inspects the set of Operation Commands to establish whether or not the Operation Command with the same Entry Code as the Suspend Command can still be suspended because of the number of operations to be executed one or more had not been started yet.

If so, it returns a Suspend Indication, which contains an Integer that states how many times an operation will be suspended. This integer can be derived from the Operation Command with the correct Entry Code in the set of Operation Commands (repeat number). Next, the module inserts the Entry Code in the set of Entry Codes of suspended operations.

If no suspend is possible, it returns a Suspend Indication with parameter zero.

3. or, receives a Continue Command destined for the work station. It will then remove the Entry Code contained in the Continue Command from the set of Entry Codes of Suspended Operations. If this Entry Code is not present there, this set remains unchanged.

4. or, receives a Cancel Command destined for the work station. It then inspects the set of Operation Commands to establish whether this command may be cancelled because of the number of operations to be executed (one or more) had not been started yet.

If so, it returns a Cancel Indication. The Cancel Indication Contains an Integer that states how many times an operation will be cancelled. This repeat number is derived from the set of Operation Commands. It then inserts the Entry Code in the set of Entry Codes of cancelled operations and removes (if present) the Entry Code from the set of Operation Commands and removes the Operation Command concerned from the set of Operation Commands.

If cancelling is impossible, it returns a Cancel Indication with the integer zero.

5. or, it receives from the process, EXECute COMmandS, which is executing accepted Operation Commands, a request to report whether or not a certain Entry Code belongs to those Operation Commands that
a) should still be executed or are completed (with respect to the repeat number that tells how often an execution should be repeated), or
b) have been suspended, or
c) have been cancelled.

Having reported one of alternatives a)–c), ACCEPT COMmandS, does one of the following:

If the operation has been cancelled and the repeat number is still greater than zero, ACCEPT COMmandS removes the Entry Code from the set of cancelled Entry Codes.

If the operation has not been cancelled, and has not been suspended, and the repeat counter is still greater than zero, ACCEPT COMmandS decrements the repeat number.

If the operation has not been cancelled, has not been suspended and the repeat counter is less than or equal to zero, ACCEPT COMmandS issues a Progress Indication to the host with the progress status 'ready', and removes the Operation Command from the set of Operation Commands, and the Entry Code from the set of suspended and cancelled Entry Codes.

If the operation has not been cancelled, the repeat number is still greater than zero, but the operation has been suspended, accept COMmandS does not change the set of Operation Commands, nor the sets of suspended and cancelled Entry Codes.

6. Or, finally, ACCEPT COMmandS can receive an indication that the execution of an Operation with a certain Entry Code has been blocked from the process, EXECute COMmandS, (meaning that the search for a Recipe Line that can be processed takes too much time).

ACCEPT COMmandS searches for the Operation Command with this Entry Code in the set of Operation Commands, and then issues a Progress Indication to the host that contains the Entry Code and the Progress Status 'blocked'.

After execution of any of steps 1 through 6, a next one of the same steps can be executed.

2.1.2. EXECute COMmandS

The process, EXECute COMmandS :

1. Either, receives an Operation Description and an Entry Code from ACCEPT COMmandS, 2. or takes one of the Operation Descriptions of the set of autonomous operations; then receives a Recipe suitable for the execution of the Operation Command. Any Recipe is accepted from the process, RECIPE MANAGER, if that of the Operation Descriptions Recipe and of the Operation Command are equal. EXECute COMmandS then makes the actualised Recipe available for the Operation Command, then executes this Recipe as many times as required.

3. Concurrently, accepts an Operation Command and processes these as discussed in item 1 and 2. (Hence, the work station controller can execute an infinite number of commands in parallel).

2.1.3. The Execution Of A Recipe (Execute Recipe)

Below, the execution of a recipe, for the fulfilling of a commanded operation is discussed first. Next, the execution of a recipe for an autonomous operation is discussed.

2.1.3.1. FOR A COMMANDED OPERATION 2.1.3.1.1. First, ACCEPT COMmandS is asked (by reference to the Entry Code) whether the operation is cancelled, suspended or should still be repeated.

If cancelled, the execution of the recipe stops.
If the operation should be no longer repeated, the execution of a recipe stops.
If suspended, the behaviour detailed here is repeated.
If not cancelled, nor completed nor suspended, the execution continues.

2.1.3.1.2. If the execution of a recipe is continued, a Recipe Line suitable for processing is selected.

2.1.3.1.3. PROCESSING BY RECIPE LINES

1. All lines of the Recipe with the required Step Number are candidates for processing. When the execution of a Recipe is started, a line with Step Number 'init' is searched for. There is a set of lines with the correct step number. One line of them has to be executed. First, one of them, suitable for execution is selected for evaluation.

First, the M MODULE is asked whether or not there is an alarm. If so, the activities detailed under 2 (here) are repeated, else, evaluation of Recipe Lines continues.

The M MODULE is dedicated exclusively, so that only the process EXECute COMmandS has access to the world model for the processing of this recipe line. The set of conditions of this line and its Update Status Instructions and its Move Status Instructions are passed to the M MODULE. This process checks whether or not all conditions of the recipe line with respect to the contents of the world model are true. If these conditions are true, the M MODULE 25 will execute the (recipe line) Update Status and Move Status Instructions. Finally, the M MODULE will report whether or not the conditions were true (and consequently, whether or not the instructions were executed).

Next, the Send Message Instructions of the recipe line will be executed by the process, EXECute COMmandS, in an arbitrary order.

EXECute COMmandS will send each message to its destination: If the message is destined for an automation module, EXECute COMmandS also requests the M MODULE 25 to accept a Status element with the variable 'receiver of the message, the operation the message is referring to' and one of the following values:

if the message is an Operation Command, the value 'issued'.

if the message is a Reset Command, the value 'reset'.

If the message is destined for the transport system, EXECute COMmands also requests the M MODULE to accept an element with the variable 'accesspoint' and one of the following values:

if the message is a 'Control Passed' message, the value 'noBody'.

if the message is a 'Control Workstation Transport System Request' message, the value 'issued'.

If the message is destined for the host 20 (progress indication or status indication), th's message is sent to the host without updating the world model. Next, if the next step number of the executed line is 'exit', no further recipe line is executed.

if the next step number of the executed line is not 'exit', the activities detailed under 2.1 are repeated with the group of lines with this next step number.

If the conditions were not fulfilled, the instructions had not been executed, and a subsequent line (possibly the same) with the same step number is considered for evaluation and execution.

2.1.3.1.2.2. If, after a certain time out period, no Recipe Line has been selected, EXECuteRECipe may decide to issue an indication to ACCEPT COMmandS to report that the operation with a certain Entry Code is blocked. The searching for a Recipe Line as described above continues.

2.1.3.2. FOR AUTONOMOUS OPERATION

The processing of a recipe for autonomous operations occurs in a similar way, except for:

suspension, canceling and repetition of the execution of a recipe are not considered.
there is no time out period.
The recipe manager has to:
1. Either, process a recipe update request.
receive an update request (from the product preparation sysem) that contains a recipe. If this recipe replaces an existing recipe because it has the same recipe description, delete the existing one and insert the recipe contained in the update.
2. Or, process a recipe delete request.

receive a delete request (from the product preparation system) that defines the recipe identification of the recipe that should be deleted.

then, if a recipe with this identification is present, delete the recipe.

3. Or, delete one recipe on own initiative.

delete one of the recipes managed by the recipe manager. This is to control the deletion of recipes due to limited memory space.

4. Or, offer the process EXECute COMmandS a recipe that is required by the process EXECute COMmandS.

When any activity (1, 2, 3 or 4) is finished, RECIPE MANAGER can execute a subsequent one.

2.2. THE G MODULE:

1. first initialises.

The following application-dependent data are received from the WORKSTATION CONTROLLER MANAGER, 21
- a set of Status Request Information Tuples, which prescribe the status that should be monitored by the workstation controller.
- The Partners. This is a set of addresses of the automation modules, the address of the transport system and the address of the workstation controller itself.
- The locations. These are the Variables of status elements that describe the places at which products or tools may reside.
- The access points where products and tools may enter or leave the workstation controller area.

2. then, behaves as five concurrent processes:

RECeiVe STATus and EXECute STATus: Status Indications from Automation Modules are received by RECeiVe STATus and presented to EXECute STATus. EXECute STATus updates the world model and determines which aggregated status is to be sent to the host and/or world model. The relationship between received status and other statuses kept in the world model and aggregated status is given in the formulae. In addition, RECeiVe STATus issues Status Requests to Automation Modules.

FORMULA MANAGER: in which the formulae are maintained, updated or deleted.

PROVIDE STATus Status Requests from the host are responded to

TRANSFER RESOURCE CONTRol: in which messages are exchanged with the transport system to control product transfer between work station and transport system or between two work stations.

RECeiVe STATus, EXECute STATus, PROVIDE STATus, FORMULA MANAGER and TRANSFER RESOUCE CONTRol are detailed in the following sections.

2.2.1. RECEIVE STATUS

Using the set of status request information tuples and the addresses of the automation modules and the work station itself as application-dependent data, the process RECeiVe STATus :

1. Issues Status Requests. It inspects the set of Status Request Information Tuples, and uses the Variable and Address in one Tuple to generate a Status Request to an Automation Module.

2. Receives Status Indications. It receives a Status Indication destined for the work station, and presents these to EXECute STATus In some cases, a special Status Element is generated with the Variable 'sender of the message, the operation that is referred to' and the value:
- if the message is an Acceptance Indication: 'busy'.
- if the message is a Rejection Indication: 'rejected'.
- if the message is a Progress Indication: the status of progress.

2.2.2. EXECUTE STATUS

EXECute STATus receives Status from RECeiVe STATus and requests the M MODULE to update its world model according to this status. Next, the Formula defining the relations between most recently received status and existing status is selected. The formula contains several formula lines. Each formula line consists of one or more conditions and one or more instructions. Each of these lines is evaluated as to whether or not all conditions in the line are fulfilled. The evaluation of one formula line is as follows: EXECute STATus locks the world M MODULE to ensure exclusive access to the world model.

The set of conditions of the formula line, its Update Status Instructions and its Move Status Instructions are passed to the M MODULE. This process checks whether all conditions of the formula line with respect to the contents of the world model are true.

If so, the M MODULE will execute the Update Status and Move Status Instructions. Finally, the M MODULE will report whether or not the conditions were true (and consequently, whether or not the instructions were executed).

Next, the Send Message Instructions of the formula line will be sent in an arbitrary order to the host by the process EXECute STATus. Next, EXECute STATus unlocks the M MODULE.

if any condition is not true, the M MODULE is unlocked.

2.2.3. Alarm Handling

Alarms can be considered as special cases of aggregate status. Alarm messages if needed have to be incorporated in the set of Send Message Instructions of Formulas.

2.2.4. FORMULA MANAGER

The formula manager has to:

1. Either, process a formula update request.

receive an update request (from the product preparation system) that contains a formula.

then, if this formula replaces an existing formula because it has the same formula description, delete the existing one and insert the formula contained in the update.

2. Or, process a formula delete request.

receive a delete request from the product preparation system that defines the formula identification of the formula that should be deleted.

then, if a formula with this identification is present, delete the formula.

3. Or, offer the process EXECute STATus a formula that is required by the process EXECute STATus.

When activity 1, 2 or 3 is finished, FORMULA MANAGER can again execute either activity 1, 2 or 3.

2.2.5. PROVIDE STATus

Using the locations and the address of the host as application-dependent data, PROVIDE STATus:

1. receives a Resource Request destined for the workstation.
   Then, PROVIDE STATus requests the M MODULE to report the identifiers of resources that are located at the positions of the 'locations'.
   Then, PROVIDE STATus counts the number of identifiers that equal the identifier contained in the Resource Request, and sends this number to the host in a Resource Indication Message.

2.2.6. TRANSFER RESOURCE CONTRol

Using the access points, the locations and the addresses of work station controller module and transport system as application-dependent data, TRANSFER RESOURCE CONTRol simultaneously controls each of the access points:
1. either, it processes control transfer requests from the transport system:
   a. receives a control transfer request from the transport system directed to the work station controller module concerning the access point.
   b. then, locks the world model and asks the world model manager to insert status that states that the access point is claimed by the transport system, provided that in the world model the access point is claimed by nobody.
   c. then, receives from the world model manager, a reply that states whether or not the conditions for updating were true and unlocks the world model.
      i. If not, a control refused message concerning the access point is returned to the transport system.
      ii. If so, a control granted message concerning the access point is returned to the access point.
      iii. Or, TRANSFER RESOURCE CONTRol receives a control passed message concerning the access point. TRANSFER RESOURCE CONTRol then updates the world model with status that states:
      iv. the name of the product, as contained in the control passed message, that resides at the location of the entry point and associated product data.
      v. the fact that no element is claiming control of the access point.
2. or, receives a control granted message from the transport system concerning the access point. Next, TRANSFER RESOURCE CONTRol updates the world model with status that states that the control of the access point has been granted.
3. or, receives a control refused message from the transport system concerning the access point. Next, TRANSFER RESOURCE CONTRol updates the world model with status that states that the control of the access point has been refused, and continues to behave as detailed in 1, 2 or 3.

2.3. The M MODULE 25:

1. first initialises. It receives the application-dependent initial world model from the work station controller manager 21.
2. Then, it behaves as WORLD MODEL MANAGER. It manages the world model by processing requests for status and updating the model with Status received from both the H and G MODULE.

A. WORLD MODEL MANAGER

The WORLD MODEL MANAGER has to:

1. either, receive and process update requests. It has been described in sections EXECute COMmand and EXECute a STATus that updates on the world model also depend on the current state of this world model. Updating the world model is enabled to at most one participating process at a time to guarantee the consistency of the world model. This is done as follows:
   a. first receive a lock request
   b. next,
      i. Either receive and process an Update Status Request, that specifies a status element that should be inserted in the world model. Then, insert this status element and remove the existing status element, if any, with the same status descriptor as that of the status element contained in the update request.
      ii. or receive and process a Move Status Request. Assign the Value of the Status element with the first Variable to the Status Element with the second Variable. The Status element with the first Variable receives the Value 'noResource'.
      iii. or receive and process conditions and update status commands and indicates whether or not these conditions were fulfilled
         receive a set of conditions and a set of status elements and return a 'true' if the conditions are true with respect to the world model a, "false" if not. If true, the world model is updated according to the new status elements.
      v. or receives and processes conditions and update status or move status commands. If the conditions are true, the world model is updated according to the new status elements.
2. or, receive and process request for one or more Status elements: receive a status request that specifies a status Variable or a set of Variables, then supply the requested status elements.

3. FURTHER ORGANIZATIONAL DESCRIPTION

Figure 3:
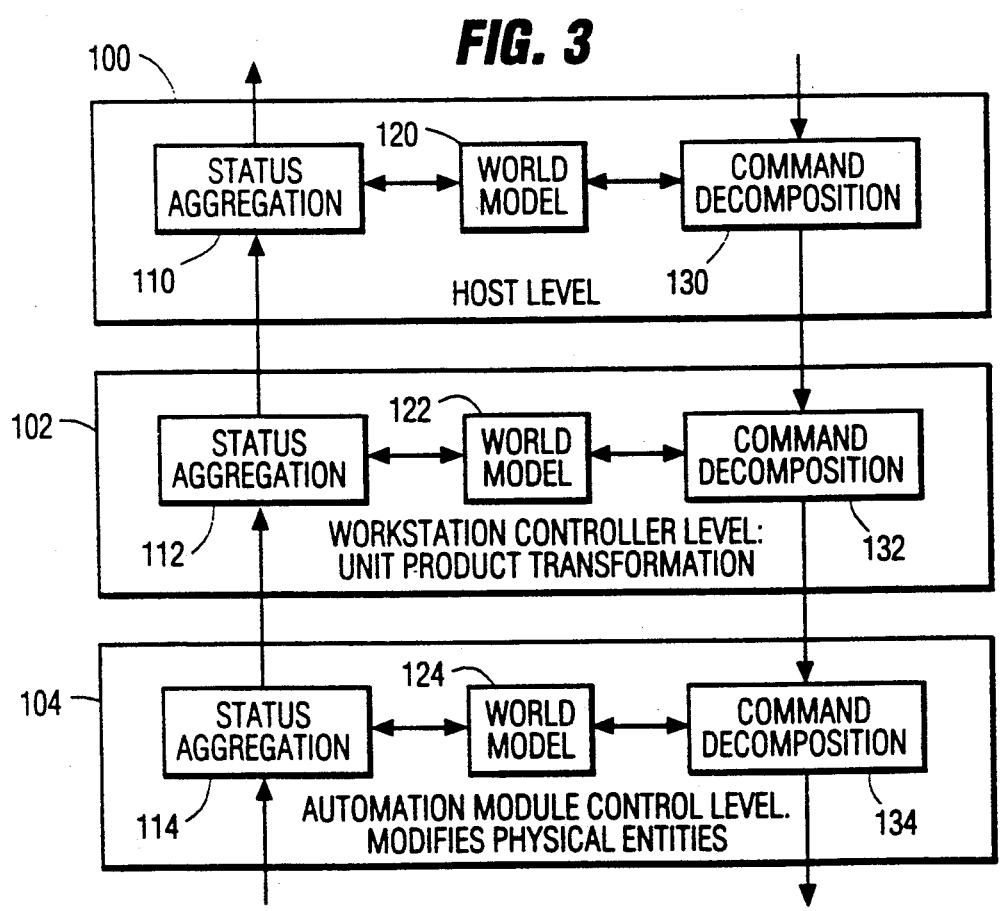
FIG. 3 shows the functional set-up of the command decomposition versus the status aggregation.

FIG. 3 shows the functional set up of the command decomposition versus the status aggregation. Three successive hierarchical levels are shown. The upper one 100 may control the complete production line from raw material to finished product. The second level 102 controls the unit product transformation. The third level 104 modifies the respective physical entities. The work station controller module 102 is on the middle level. Each level has its own world model, which is restricted to the aspects relevant to the level in question. For example, the lower level knows physical and geometrical aspects of each separate product present. The next higher level could know the number of products present without knowing physical details. As the situation may require, the number of successive layers may be higher or lower. On their own respective level, the world models communicate with command decomposition elements 130, 132, 134 and status aggregation elements 110, 112, 114. On each level a composite command may be separated into more elementary commands. On each level a number of more elementary status signals may be aggregated to more composite status signals. For example, an aggregated alarm may be ORed from a plurality of elementary alarms. A plurality of elementary stock feed requests is added to a composite stock feed request by adding the requested quantities.

3.1. MESSAGES

Hereinafter, messages are discussed systematically between the host and the work station controller

| name | communicators | entry code | further: |
|---|---|---|---|
| operation command | x | x | operation description, repeat counter |
| suspend/continue/cancel commands | x | x | — |
| acceptance/reject.ind. | x | x | — |
| suspend/cancel ind. | x | x | repeat counter |
| resource request | x | | resource identif. |
| resource identifier | x | | resource ident., integer |
| progress indication | x | x | status of progress |
| status request | x | x | status variable none |
| status indication | x | | status |

Herein, the -Communicators- define the sender and receiver of the Message.

1.1.1. OPERATION Command

The Operation Command commands an execution of an operation on resources, and may indicate one or more products and one or more operations.
The Repeat Counter defines how many times the execution must be repeated.
The Entry Code facilitates a reference to an Operation Command.
Some relationships with other messages:
An Operation Command is accepted or rejected by the work station controller module. In the case of acceptance, the latter returns an Acceptance Indication with the Entry Code for reference to the accepted Operation Command. In the case of rejection, a Rejection Indication is returned that contains the Entry Code.
Suspend Command, Continue Command and Cancel Command temporarily stop, restart and permanently stop the execution of the operation, respectively.

3.1.2. Suspend Command

The Suspend Command is used to temporarily stop the execution of an operation, in the sense that during the suspension no resources (materials/tools) should be delivered by the workstation.
Parameters:
The Entry Code refers to the Operation Command, whose execution is to be suspended.
The work station controller reacts to a Suspend Command with a Suspend Indication.

3.1.3. Continue Command

The Continue Command is used to cancel certain Suspend Commands so that the execution of any suspended operation is continued.
Parameters:
The Entry Code refers to the Operation Command, the execution of which is to be continued.
The Continue Command deletes a Suspend Command that has the same Entry Code.

3.1.4. Cancel Command

The Cancel Command is used to prevent further execution of certain Operation Commands. If the operation has not yet started, it will no longer be started. In case the Operation Command commanded a series of operations, that part of the series that has not yet started will no longer be executed.
The Entry Code refers to the Operation Command, the execution of which is to be cancelled.
Some relationships with other messages:
The Cancel Indication reports the cancellation.

3.1.5 Acceptance Indication

The Acceptance Indication is used by the work station to indicate that it can execute a certain operation. The operation can be executed if it does not conflict with the (permanent) ability of the work station. The presence of tools or materials is not evaluated.
The Entry Code refers to the Operation Command that is accepted.
The work station controller may also respond to an Operation Command either with an Acceptance Indication or with a Rejection Indication.

3.1.6. Rejection Indication

The Rejection Indication is used by the work station to indicate that it cannot execute a certain operation because of a permanent inability of the work station. A temporary shortage of tools or materials is not signalled.
The Entry Code refers to the Operation Command, the execution of which is rejected.
Some relationships with other messages:
The Rejection Indication may be a response to an Operation Command as alternative to an Acceptance Indication.

3.1.7. Suspend Indication

The Suspend Indication is used by the work station to report its fulfilment of a Suspend Command.
The Entry Code refers to the Operation Command, the execution of which has been suspended.
The Repeat Counter indicates how many operations have been suspended, for possible later execution.

3.1.8. Cancel Indication

The Cancel Indication is used by the work station to report its fulfilment of a Cancel Command.
The Entry Code refers to the Operation Command, the execution of which has been cancelled.
The Repeat Counter indicates how many operations have been cancelled.

3.1.9. Resource Request

The Resource Request is used by the host to inquire about the number of certain resources (materials, tools) present within the domain of control of the work station.
The Resource Identifier defines the resource.

3.1.10. Resource Indication

The Resource Indication is used by the work station to inform the host about the number of certain resources (materials, tools) present within the domain of control of the work station.
The Resource Identifier defines a resource.
The Integer indicates the number present.
The Resource Indication can be either a response to a Resource Request, or a non-solicited message, generated by the work station.

3.1.11. Progress Indication

The Progress Indication is used by the work station to inform the host about the progress of the execution of certain operation commands. The execution can be ready or temporarily blocked, for example because of a shortage of materials or tools.

The Entry Code refers to an Operation Command, of which the execution progress is reported.

The Status of Progress (ready/blocked) defines the progress.

3.1.12. Status Request

The Status Request is used by the host to be informed (of part) of the status of the work station.

The Variable refers to the required Status.

The Status Indication reports the Status Variable and the actual Status Value.

3.1.13. Status Indication

The Status Indication is used by the work station to inform the host about a certain status. Status Indication can be provided on command of the host or spontaneously.

The Status Indication contains a Status Element.

3.2. WORK STATION CONTROLLER - AUTOMATION MODULE

The following Messages are exchanged between work station controller module and automation module:

| Name of the message | com- municators | op- eration | further |
|---|---|---|---|
| OPERATION COMMAND | x | x | |
| RESET COMMAND | x | x | |
| ACCEPTANCE INDICATION | x | x | |
| REJECTION INDICATION | x | x | |
| PROGRESS INDICATION | x | x | status of progress |
| STATUS REQUEST | x | x | status variable |
| STATUS INDICATION | x | x | status element |

1. The operation Command is used to command the execution of an operation.

The Operation Identifier defines the operation to be executed.

Some relationships with other messages:

An Operation Command is accepted or rejected by the automation module controller, which returns an Acceptance Indication or a Rejection Indication, respectively.

Reset Command can stop the execution of the operation by returing the automation module to a predefined state.

2. The Reset Command is used to disrupt the execution of an operation.

The automation module returns to a pre-defined state.

The Operation Identifier refers to the Operation, the execution of which is to be disrupted.

3. The Acceptance Indication is used by the automation module to indicate that it can execute a certain operation because of permanent ability.

The Operation Identifier refers to the Operation Command, the execution of which is rejected.

The Acceptance Indication is a response to an Operation Command.

The automation module may alternatively respond to an Operation Command with a Rejection Indication.

4. The Rejection Indication is used by the automation module to indicate that it cannot execute a certain operation, because of a permanent inability.

The Operation Identifier refers to the Operation Command, the execution of which is rejected.

5. The Progress Indication is used to report the progress of an operation. The progress can be:

'ready', when the operation is completed, or

'blocked', when the operation is temporarily suspended because of missing materials or tools.

6. The Status Request is used by the work station controller to be informed of (part) of the status of the automation module.

The Variable refers to the required Status.

7. The Status Indication is used by the automation module to inform the work station controller about a certain status. Status Indication can be provided either on the command of the work station controller or self-reliantly.

The Status Indication contains a Status Element.

3.3. WORKSTATION CONTROLLER - TRANSPORT SYSTEM

The work station controller and transport system communicate in order to transfer the control of resources (materials, tools). The following control transfer messages are used.

| Name of the message | com- municators | access point | further |
|---|---|---|---|
| CONTROL TRANS WORKST REQUEST | x | x | |
| CONTROL WORKST TRANS REQUEST | x | x | |
| CONTROL GRANTED | x | x | |
| CONTROL REFUSED | x | x | |
| CONTROL PASSED | x | x | product, product Data |

The Communicators define the sender and receiver of the Message. The Access Point defines a place where products or tools may enter or leave the work station controller's domain of control.

Short description of the messages: 1. The "Control Trans Workst Request" message is used by the transport system to ask the work station controller for permission to pass control of a product or a tool from the transport system to the work station controller. 2. The Control Workst Trans Request message is used by the work station controller to ask the transport system for permission to pass control of a product or a tool from the work station controller to the transport system. 3. The Control Granted message is used by a sender to grant permission to pass control of a product or tool from the receiver to the sender. 4. The Control Refused message is used by a sender to refuse permission to pass control of a product or tool from the receiver to the sender. 5. The Control Passed message is used by a sender to acknowledge that control of a product or a tool has been passed to the sender.

In addition to communicators and access points, the Control Passed Message has two parameters: 1. Product: This concerns all information that is available to the system that has the product under its control. An example of such information is the name of a product. 2. Product Data: This is information so closely associated with a product that the sender of the data requests the transport system to transfer the data simultaneously with the product.

3.3. APPLICATION-DEPENDENT DATA

The work station controller is tailored to its application by provision of pertinent data. In particular, 'recipes' prescribe how the work station controller should execute certain operations, selection of certain materials, a certain configuration of automation modules in its domain etc.

Application-dependent data as input are separated from the command and status interfaces with the host, automation modules and transport system. The reason is that the provision of the application-dependent data is not the responsibility of the host. The host determines what is to be done by the work station. It does not determine how it is to be done. The host, for example, commands the execution of a particular operation; the recipe prescribes how this operation should be executed.

'Partners' are sets of addresses or names of the subsystems that should communicate. These are, the address of the work station itself, of the automation modules, of the transport system and of the host.

LOCATIONS are a set of Variables of Status elements that refer to places where the work station controller can locate such resources as material and tools. The work station controller maintains Status elements that consist of these Variables and of Values that describe the Identity of the product or tool at that location.

ACCESS POINTS are variables referring to the locations at which products can pass from the transport systems domain of control to the work station's domain of control or vice versa. These locations are controlled by both the transport system and the work station controller. The variables are used by the workstation controller itself, and can also be used in recipes to assign the control of a location.

A WORLD MODEL is contained in the work station controller and gives a model of the state and capabilities of its subordinates. Among others, this is needed to reflect the global state of the work station. Depending on this state, the work station controller may decide to execute different actions.

At start-up, an initial world model is fed into the work station controller. During operation, the work station controller updates this model.

The model is a set of Status elements. Each Status element consists of a Variable and a Value, for example, a location and a product name, saying that a Product is present at a Location.

3.4. SET OF STATUS REQUEST INFORMATION TUPLES

Because the work station controller should update its world model, it should know which information it should collect for this purpose. The updating may occur by issuing appropriate status requests to automation modules. Therefore, the work station controller needs to receive information that says which types of status it has to collect from which automation module. This is defined by a set of so-called Status Request Information Tuples. A Status Request Information Tuple contains a Variable and an Address of an automation module.

The work station controller will issue requests to the systems at these addresses to supply the Status element belonging to the Variable.

3.5. RECIPES

A recipe is a prescription of how a work station controller should execute a command. A Recipe consists of a Recipe Identification and a sequence of one or more Recipe Lines.

3.5.1. Recipe Identification

A Recipe Identification is an Operation Description which defines the Operation for which the Recipe can be used. A recipe line consists of:

|Step Number |Conditions |Instructions |Next Step Number|

1. A step Number identifies a step in the execution of a Recipe. A Recipe Line specified by this Step Number will be executed. There may be more than one Recipe Lines with the same Step Number. However, only one of the Recipe Lines can be selected for further execution. Which one will be executed depends on its Set of Conditions as will be explained below.

2. A set of Conditions is an assertion about a Status Variable and Value. For example 'temperature equals 100' consists of a Variable, an Operator and a Norm Value.

The Variable refers to a Status element in the world model of the work station controller. The work station controller compares the Condition with the Status element of the world model, and determines whether or not the Condition is satisfied, given the Value of the Status.

The Operator can be an equal (=) or not-equal (#) to the operator and can act upon all sorts of Values. It can also be a less than (<) or greater than (>) operator provided that the Values can be ordered.

A Recipe Line can only be executed if all Conditions of its set of Conditions are met. The Conditions may define more than one assertion about the same Variable, for example:

| | |
|---|---|
| temperature < 100 | "temperature less than 100" |
| temperature > 90 | "temperature greater than 90" |
| location1 = productx | "at location1 is productx" |

3. The Set of Instructions are those that should be executed if the conditions of the recipe line are true:

Send Message Instruction; the Recipe Instruction consists of a Message that should be sent to its destination (automation module, host or transport system). Such a message could be, for example, an Operation Command for an Automation Module.

An Update Status Instruction consists of an Element as discussed earlier. The work station controller will update the world model with this Status.

Move Status Instruction consists of two Variables.

In order to execute a Move Status Instruction, the work station controller will update the world model, by assigning to the status element with the second Variable, the value associated with the first Variable, and assign the value 'noResource' to the first Variable.

Assume, for example, that the world model contains the following two status elements:

| location1 | Productx |
|---|---|
| location2 | NoProduct |

After the execution of the Move Status Instruction,

| location1 | location 2 | the world model contains the following two Status elements:

| location1 | noResource |
| location2 | Productx |

Execution of a move status instruction

The Move Status Instruction is used to update the world model if products have been transported from one place in the work station controller's domain to another.

When a Recipe Line is processed, all Recipe Commands of its Set of Recipe Instructions are executed. The order of execution is arbitrary.

4. Next Step Number identifies the Step Number of a Recipe Line that should be executed next. There is one special Step number, 'exit' which means that there is no next
Recipe Line that should be executed.

3.5.2. Recipe Processing

The following scheme shows the sequence of activities that take place when a recipe is processed.

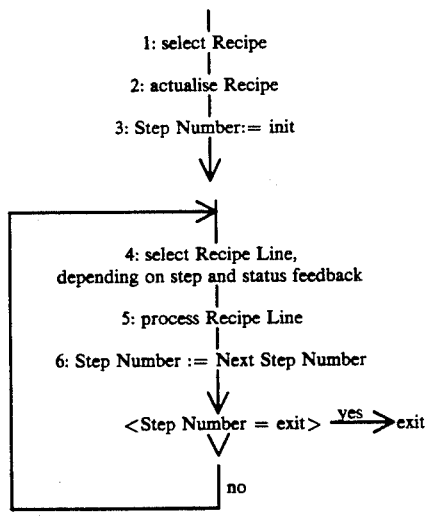

1. The work station controller selects a Recipe that has an identifier that matches the Operation Description of an Operation Instruction that should be executed.

The possible forms of matches are:
a. The Operation Description and the Recipe Identity are identical.
b. The Product Identifier of the Operation Description lies within the range of Product Identifiers specified in the Recipe Identity.

2. The Recipe has to be actualised. The Recipe may contain variables for which actual values should be substituted during processing. These variables concern Product Identifiers. Assume, for example, a Recipe Identity of a Recipe for a dispatch operation. In the Recipe, the product that is dispatched is referred to by a variable 'x'. Assume that this Recipe Identity matches by an Operation Description 'Dispatch product1'. Now, the actualised recipe will contain the value 'product1' instead of the variable 'x'.

3. The Step Number of the first Recipe Line that is processed in 'init'.

4. A Recipe Line has to be selected for processing. A Recipe Line can only be processed if its Step Number has the right value and if all its Conditions are satisfied. The work station controller will inspect its world model to decide whether or not all the Conditions of a particular Recipe Line are satisfied.

If there is more than one Recipe Line with the same Step Number, the work station controller will select one for evaluation in an arbitrary order until it finds one Recipe Line that is suitable. If no Recipe Line is eligible for execution, the selection will be repeated (changing status conditions may change the suitability of a recipe Line for processing).

5. The selected Recipe Line is Processed. This means that the Recipe Instructions contained in the selected Recipe Line have been executed. A Recipe Line may contain more than one Recipe Instruction. These are executed in an arbitrary order. There are three types of Recipe Instructions, viz.
Send Message Instructions
Update Status Instructions
Move Status Instructions 6. The Step Number of the next Recipe Line to be processed is the Next Step Number of the most recently processed Recipe Line. If this number is 'exit', the processing of the Recipe has finished. If not, the next Recipe Line has to be processed.

3.6. Simultaneous Use Of Resources By More Than One Recipe

Development of a recipe can be considered as the development of a program for a work station controller. The variables referred to in the set of conditions of a recipe line are global variables accessible for all recipes that are executed, as they are in the world model.

The work station controller will execute only one recipe line at a time and the next recipe line can only be started if all instructions of a previous recipe line have been executed.

More than one recipe may execute simultaneously and issue conflicting commands for a single automation module, space, tool or product. For example, if one recipe may require an automation module to move from A to B while another recipe requires an automation module to move from A to C.

Such conflicting claims can be avoided if the recipes are programmed correctly. The global character of a status variable and execution of recipe lines one-by-one can be used to this end.

The following mechanism is used. A recipe may request the updating of status in the world model. Status is assumed to consist of a Variable that describes the resources and a Value that describes the Identity of a recipe that controls the resource. By updating the Value of such status types, the rights to control the resource can be tranferred.

Assume, for example, the variable 'criticalAM' and a recipe with identity 'criticalAMUser'. The following lines of a recipe guarantee that the automation module 'criticalAM' is controlled by the recipe 'criticalAMUser' only.

```
|n    |criticalAM = noRecipe  |US(criticalAM,criticalAMUser)
|n+1  |
|n+1  |
|     |                       |
:     :                       :
:     :
|m    |                       |US(criticalAM,noRecipe)
|     |
```

The standard value 'noRecipe' indicates that no recipe controls the 'criticalAM'. By executing the Update Status Instruction (US), it is indicated that the recipe 'criticalAMUser' now controls the automation module.

3.7. SET OF OPERATION DESCRIPTIONS

A work station cannot execute all possible operations. For example, due to a certain physical implementation, it cannot execute operations that require high temperatures. As a consequence, the work station controller may reject the execution of some operations.

During start-up, the work station controller should be fed with Descriptions of the operations it can execute. There are several ways to determine whether a given operation can be executed.

3.8. SET OF AUTONOMOUS OPERATIONS

Often a work station controller will be able to execute some operations directly upon becoming active, that is, without an explicit command from a host. An example is the handling of materials and tools in the domain of a work station in order to position these at optimal places.

At start-up, the workstation controller should be fed with the Operation Descriptions of these operations. Apart from the types of Operation Descriptions mentioned in the previous section, an Operation Description can be used that only defines the identifier of an Operation.

3.9. FORMULAE

A Formula is a prescription of how a work station controller should execute a received status element, apart from just updating the world model with it. A Formula consists of a Formula Variable and one or more Formula Lines, as follows:

```
              |Formula Variable
              :
              :
              :
              |Formula Line
              |Formula Line
              |Formula Line
              |Formula Line
```

A Formula Variable is a Status Variable, its Formula will be processed if a status indication is received that contains this variable.

A Formula Line contains two parts:
 a. Set of Conditions and
 b. Formula Instructions The meaning of these are identical to the meanings of Set of Conditions and Set of (Recipe) Instructions of a Recipe. However, the Formula Instructions do not contain messages to be sent to the automation modules or transport system. They can contain messages to the host.

```
| Conditions | Instructions |
```

A Formula is processed as follows:
 1. The work station controller selects a Formula that has a Formula variable matching the received Status Variable.
 2. Each formula is evaluated. The instructions of a formula line can only be processed if all Conditions are satisfied. The work station controller will inspect its world model to decide whether or not all Conditions of a particular Formula Line are satisfied. If this is the case

:

The selected Formula Line is Processed. As with the instructions in a Recipe Line, this means that the Instructions contained in the selected Formula Line are executed.

We claim:
 1. A work station controller module for controlling a work station and comprising processor means interconnected to storage means for on the basis of predetermined operation-linked process data and under control of higher level commands and lower level status signals producing lower level commands and higher level status signals, said work station controller module further comprising:
  first bidirectional communication means for receiving said higher level commands from and transmitting said higher level status signals to a host device;
  second bidirectional communication means for receiving said lower level status signals from and transmitting said lower level commands to one or more product processing automation modules;
  third bidirectional communication means for transmitting product exchange requests and receiving product exchange acknowledgements with respect to any access point the work station has in common with a product transfer system or with at least one other work station;
 first receiving means for receiving operation names and process data from a product development system;
 second receiving means for receiving status aggregation rules for aggregating said lower level status signals to said higher level status signals and command decomposition rules for decomposing said higher level commands to said lower level commands from a product preparation system.
 2. A work station controller module as claimed in claim 1, wherein said work station controller attends to said host device as first source for therefrom receiving timing signals and quantization signals for work station product transform and attends to a second source that may be different from said first source for therefrom receiving modality signals for modality controlling said work station product transform.
 3. A workstation controller module as claimed in claim 1 or 2, comprising four mutually cooperating process modules, as follows:
  an interaction module H for receiving and updating said higher level commands, for generating said lower level commands, and receiving said lower level status signalling any of initiation/non-initiation/termination/non-termination of execution of any of said second lower level commands, for managing said operation names/process data, and for activating said third communication means;

a model description module M for managing model information of a world model, inclusive of parameter data of said automation module, any assigned product and any assigned tool;

a status management module G for receiving and aggregating said lower level status signals to said higher level status signals and for checking any actual status to said world model for upon incompatibility generating an alarm signal for said interaction module, and a manager module A for specifying
logical addresses for said host device;
allowable physical locations for product/tools;
alarm conditions for specifying said incompatibility;
and for presenting application-dependent information to said interaction module, said model description module, and said status management module.

4. A work station controller module as claimed in claim 1, and comprising strategy defining means for defining a strategy of executing a higher level command as represented by associated lower level commands without this higher level command defining such strategy.

5. A work station controller module as claimed in claim 1, and comprising checking means for checking any higher level command received versus an associated recipe stored locally and upon the result of said checking specifying any associated lower level command.

6. A work station controller module as claimed in claim 1 wherein said higher level commands comprise any of the following: suspend, cancel, resume.

7. A work station controller module as claimed in claim 6, and comprising specifying means for numerically specifying a serially repetitively executable series of operations to be suspended on/or cancelled.

8. A workstation controller module as claimed in claim 2, comprising four mutually cooperating process modules, as follows:

an interaction module H for receiving and updating said higher level commands, for generating said lower level commands, and receiving said lower level status signalling any of initiation/non-initiation/termination/non-termination of execution of any of said second lower level commands, for managing said operation names/process data, and for activating said third communication means;

a model description module M for managing model information of a world model, inclusive of parameter data of said automation module, any assigned product and any assigned tool;

a status management module G for receiving and aggregating said lower level status signals to said higher level status signals and for checking any actual status to said world model for upon incompatibility generating an alarm signal for said interaction module, and a manager module A for specifying
logical addresses for said host device;
allowable physical locations for product/tools;
alarm conditions for specifying said incompatibility;
and for presenting application-dependent information to said interaction module, said model description module, and said status management module.

* * * * *